May 4, 1948. E. A. KRUEGER 2,440,959
APPARATUS FOR FEEDING AND ORIENTING ARTICLES
Filed April 19, 1943 3 Sheets-Sheet 1
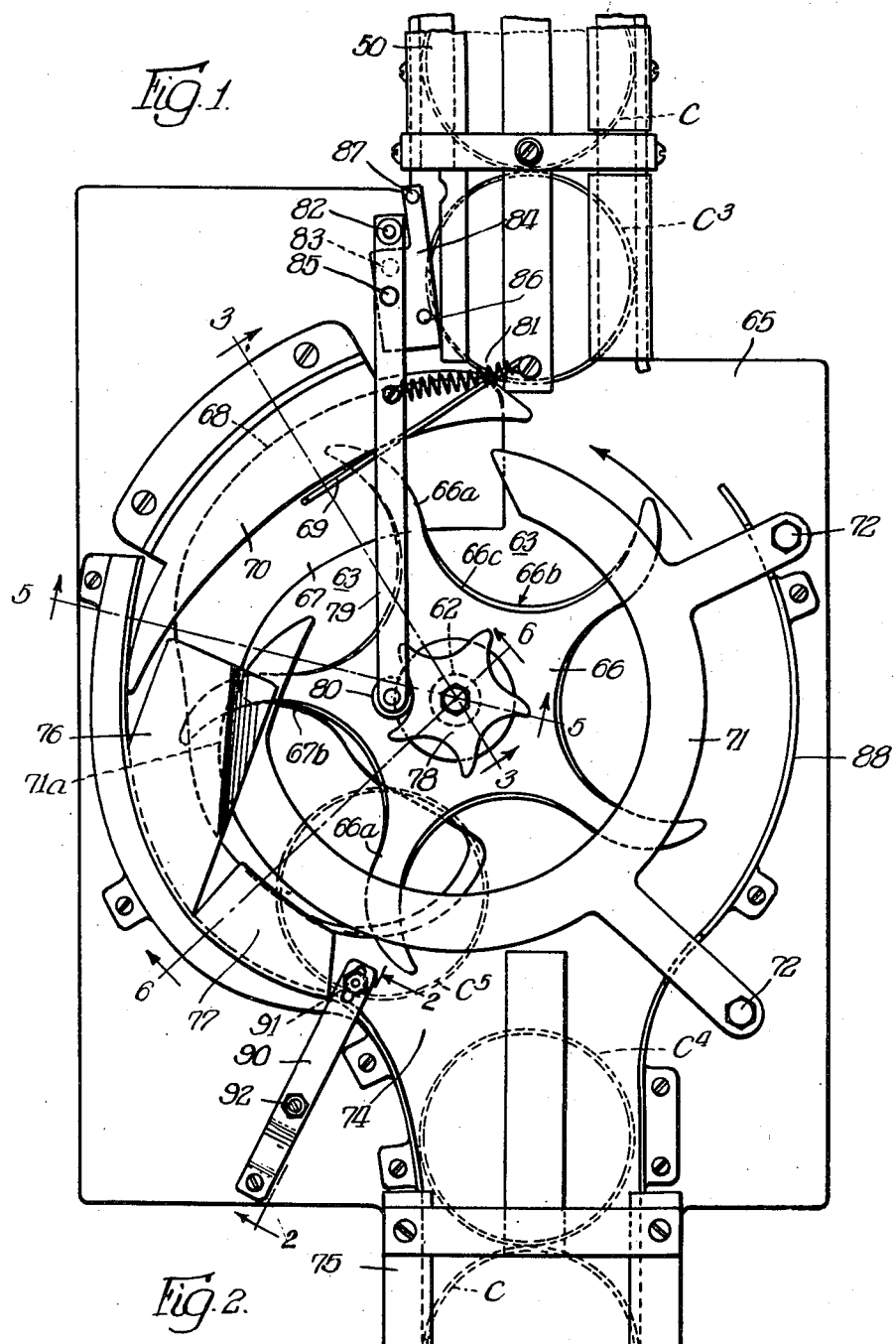
Fig.1.
Fig.2.
INVENTOR.
Ernest A. Krueger

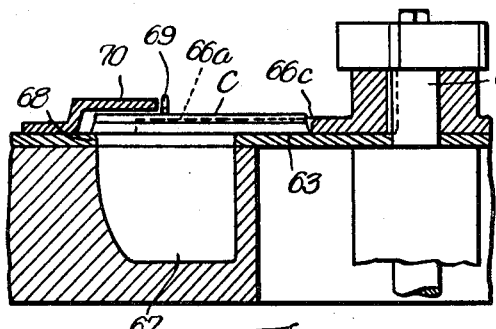
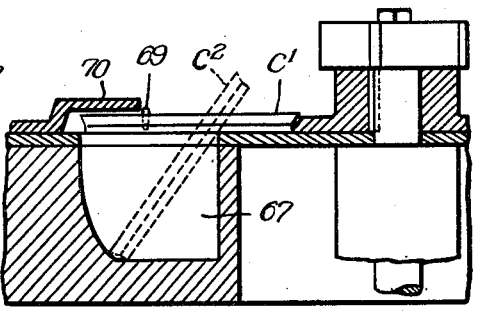
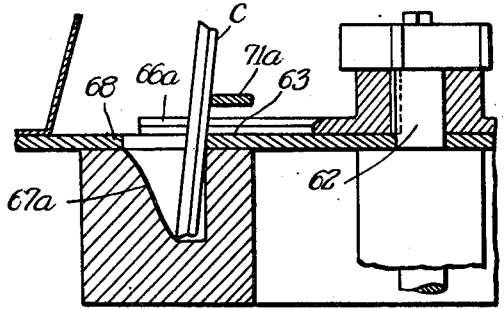
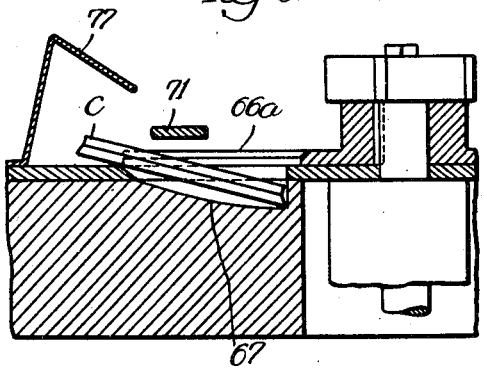
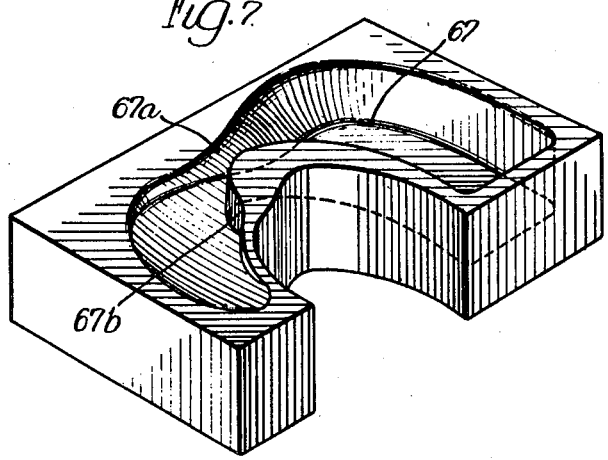

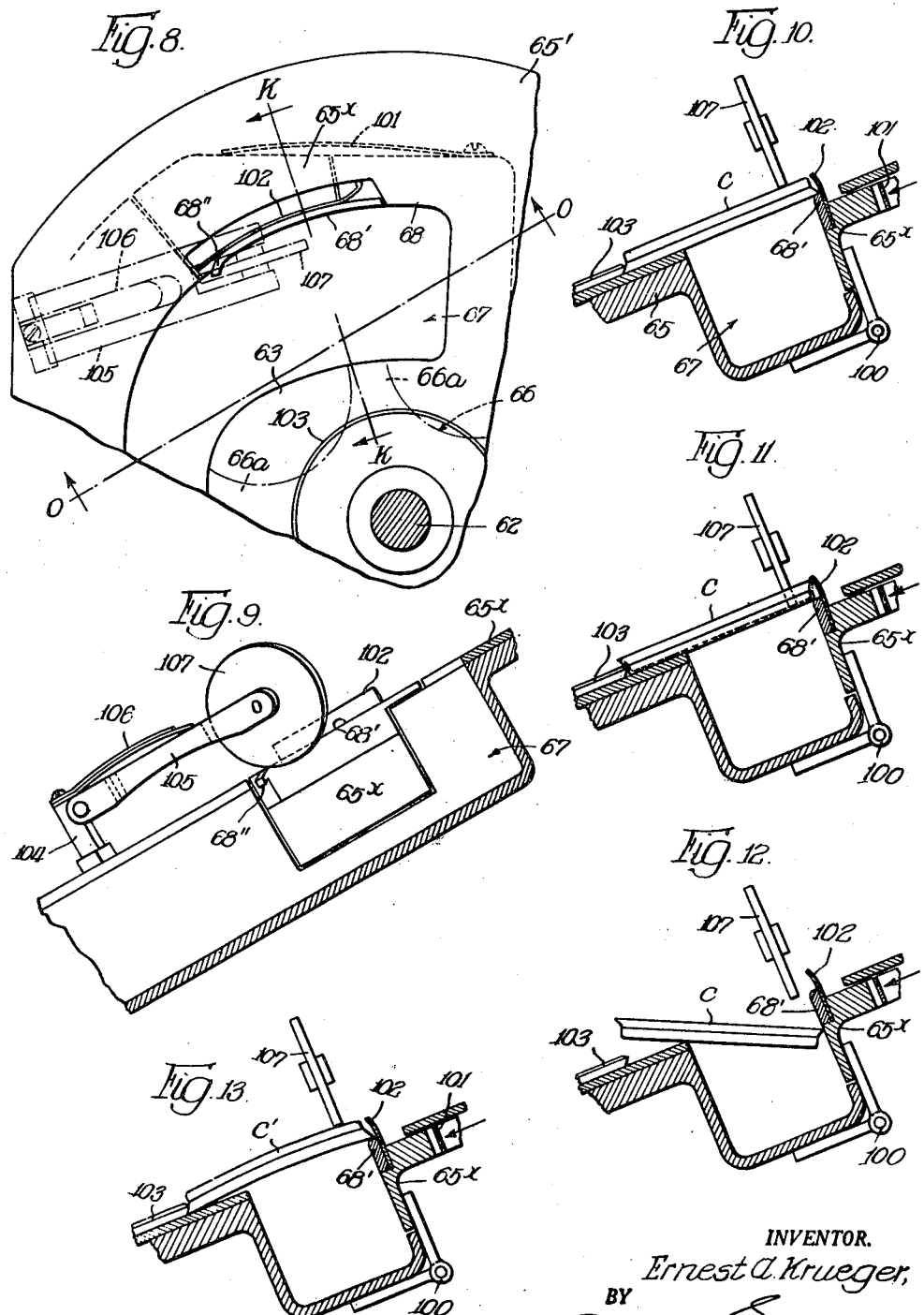

Patented May 4, 1948

2,440,959

UNITED STATES PATENT OFFICE 2,440,959

APPARATUS FOR FEEDING AND ORIENTING ARTICLES

Ernest A. Krueger, Chicago, Ill., assignor to White Cap Company, Chicago, Ill., a corporation of Delaware Application April 19, 1943, Serial No. 483,568

23 Claims. (Cl. 193—43)

This invention relates to apparatus for positioning or arranging articles in uniform disposal while they are being fed progressively in a series. One such use for which the present invention is adapted is the feeding and positioning of closure caps of kinds utilized for the closing or sealing of packing vessels such as jars, bottles, and the like. It is to be understood, however, that the invention is likewise adapted for handling articles of other specific kinds. For the purpose of explaining the invention, I show and describe it herein as embodied in an apparatus for handling closure caps. The present application is a continuation in part of my copending application filed February 24, 1941, Serial No. 380,188, and which has since issued as Patent No. 2,361,948.

In order to facilitate the rapid and accurate handling and stacking of closure caps for the purpose of packaging them at the factory, or for the purpose of feeding or supplying them rapidly and accurately to machines by which they are applied to the packing receptacles, it is important that they be positioned uniformly, for example, with their tops presented upwardly and their bottoms downwardly.

A general object of the present invention is the provision of apparatus which will operate automatically to feed such articles which are presented to it in a random condition and position all of them accurately and uniformly in right-side-up position rapidly and with minimum jostling or shifting, so as to avoid marring or damaging them.

Another particular object is the provision of apparatus whereby jamming or cramping of the articles in the device is precluded and freedom of discharge from the same is maintained at all times.

Another particular object is the provision of apparatus whereby articles which are in right-side-up position are effectively retained in that relationship while those which are in an upside-down position are automatically inverted to the desired right-side-up position rapidly and with unfailing certainty in the course of the uninterrupted progressive movement of the entire series to the intended destination.

Other purposes and advantages of the invention will be pointed out or indicated hereinafter or will be apparent to one skilled in the art upon an understanding of the present description of it or use of it in actual practice.

For the purpose of aiding in explanation of the invention, I show in the accompanying drawings forming a part of this specification, and herein-after describe, certain embodiments of it in apparatus designed for the feeding and positioning of closure caps. It is to be understood, however, that these embodiments are here presented merely for purpose of illustration and that they may be modified in various particulars and for the handling of different kinds of articles, without departing from the scope or spirit of the invention.

In said drawings,

Fig. 1 is a front view of a closure cap positioning apparatus which constitutes an embodiment of my invention;

Fig. 2 is a detail in elevation on line 2—2 of Fig. 1;

Fig. 3 is a sectional view on line 3—3 of Fig. 1 showing a closure cap in right-side-up position at that location, but with the cap and the various cap supporting portions of the apparatus being shown in horizontal position instead of in their normal sloping or inclined position;

Fig. 4 is a similar section on line 4—4 of Fig. 1 but showing a closure cap in upside-down position at that location, the cap supporting parts being shown in horizontal instead of normal inclined position.

Fig. 5 is a section on line 5—5 of Fig. 1 and showing a closure cap in the course of its inverting or righting progress, the cap supporting parts being shown in horizontal instead of normal inclined position;

Fig. 6 is a section on line 6—6 of Fig. 1 and showing a closure cap at a more advanced point in its inverting or righting progress, the cap supporting parts being shown in horizontal instead of normal inclined position;

Fig. 7 is a perspective view of a turning guide which is otherwise illustrated in Figs. 1 to 6 inclusive;

Fig. 8 is a detail or partial front view of a modified construction embodying the invention;

Fig. 9 is a sectional view taken at line 9—9 of Fig. 8 and showing the cap supporting parts in their normal inclined or sloping position;

Fig. 10 is a sectional detail on line K—K of Fig. 8 showing a cap in right-side-up position and the parts in their normal inclined position;

Fig. 11 is a similar sectional detail taken at line K—K of Fig. 8 and showing a cap in upside-down position;

Fig. 12 is a section at line K—K of Fig. 8 and showing the operation of the apparatus in the process of inverting an upside-down cap; and Fig. 13 is a section at line K—K of Fig. 8 and showing a slightly bent or arched cap in right-side-up position.

As indicated in the foregoing, the apparatus illustrated in the drawings is designed for the rapid feeding of closure caps in a series and to accomplish the uniform positioning of the caps so that all will arrive at a point of disposal in desired relationship as to sequence and in desired position or attitude. The apparatus operates automatically in the manner hereinafter described to invert such of the caps as are in upside-down position, and deliver them in proper position and relationship at the point of disposal. A complete understanding of the nature of the invention will be had most quickly from the following detail explanation of the apparatus shown.

Upon a suitable support there is mounted in steeply sloping position, a frame 65 presenting a flat upper surface in alignment at its higher end with a cap runway or chute 50 down which runway caps of the intended kind may slide by gravity from a suitable hopper or other source of supply. A shaft 62 passes through this frame and has keyed to it a star wheel 66 which rides upon the flat upper surface of frame 65. Star wheel 66 has arms 66a so shaped and disposed as to provide intervening recesses or pockets 66b each adapted to accommodate and conform to a single cap of the intended size and form when such cap is resting on the surface of frame 65. The intended caps may be of any one of various conventional forms wherein the skirt of the cap is of greater diameter at its lower end than at its upper end, and the innermost margins of the recesses or pockets 66b form abutments which are so shaped that a cap which is in any one of the recesses and is in right-side-up position will be held at a greater radial distance from shaft 62 than will be one which is in upside-down position in such recess. This may be accomplished by forming the margins of the recesses 66b with bevels or other appropriate contour, such that said recesses, in their upper portions, are somewhat deeper in the radial direction than they are in their lower portions, as illustrated for example in Fig. 3, wherein the deepened or beveled portion of the recess is designated 66c. When a cap is in right-side-up position in such recess, its wider lower end will contact the abutment afforded by the shallower margin of the recess, and hence the cap will be held at a greater radial distance from shaft 62 than would be a cap which is in upside-down position with its broader portion accommodated in the deeper upper portion of the recess, as illustrated in Fig. 4.

As viewed in Fig. 1, the star wheel is rotated in the counterclockwise direction by shaft 62 and it is so located with respect to the chute 50 that caps discharged from the latter, one after another, will slide into the successive recesses or pockets of the star wheel where they will be supported for a minor portion of their width upon the surface portion 63 of the frame which underlie the recesses.

Within a portion of the orbit of the arms 66 the frame 65 is channeled or recessed to provide a turning trough 67 (see Fig. 7) in an area underlying for the major portion of its width a cap which is moved to that location in any one of the recesses 66b. Along the outer margin of the trough or depression 67 the frame 65 affords a ledge 68 in the same plane as the cap supporting surfaces 63, and the margin of this ledge 68 is located at such a radial distance from the bottoms of the recesses 66b that the outer margin of a cap which is in right-side-up position in one of the recesses will be supported upon said ledge, as illustrated in Fig. 3, wherein the cap is designated C, whereas a cap which is in upside-down position, as indicated at C' in Fig. 4, and hence radially nearer shaft 62, will clear the ledge 68.

Accordingly, as the caps in the recesses 66b are moved along by rotation of the star wheel, those which are in upside-down position will be tilted by gravity so that their outwardly presented margins will drop into the trough 67, as to the dotted line position $C^2$ in Fig. 4. This occurs while the cap is being moved progressively by the star wheel, and the tilting of the upside-down caps is expedited by a spring 69 arranged to bear on their upwardly presented surfaces. A guard plate 70, overhanging the ledge 68 and a portion of the trough 67, is provided for the purpose of preventing the caps assuming canted positions while in the recesses 66b, and outward radial displacement of the caps from the recesses is prevented by the involute hook-like contour of the leading margins of the star wheel arms 66a which follow them.

An upside-down cap which is tilted to the position shown in dotted lines in Fig. 4, as above described, continues its progressive movement, by gravity or by pressure from the arm of the star wheel, and it is kept from contacting the preceding and following caps by the interposed arms of the wheel. In its sloping position it is supported at its lower side on the bottom of the trough 67, upon which it may roll. The trough, however, is of varying cross-sectional contour, becoming gradually narrower and shallower, so that at the radial section line 5—5 it has a form approximately as illustrated in Fig. 5, where its outer wall 67a, while steeply inclined, is considerably closer to the shaft 62 than it is at the section line 3—3. This change in the contour of the trough gradually guides the progressing cap to a more nearly vertical position and also moves it outwardly somewhat in reference to frame 65. A rigid turning strip 71 which is fixedly mounted on the frame at 72 overlies a portion of the path of the arms 66a and has an end portion 71a which juts outwardly over the inner side of the trough 67. As the cap continues its progressive movement, its inwardly presented side is brought into contact with the edge of the strip 71a (see Fig. 5), with the result that, upon further progressive movement, the upwardly presented portion of the cap is swung outwardly past the vertical position. This occurs at or about a location where the trough 67 is considerably widened inwardly, as at 67b, which inwardly widened portion of the trough is for the purpose of accommodating the cap in its now inwardly inclined position, in which position its outwardly presented portion is supported on the outer rim of the trough 67 (see Fig. 6). The cap still remains between the star wheel arms, which continue to control its progressive movement and keep it spaced from those behind and ahead of it, and as the lower portion of the trough gradually decreases in depth, the inwardly presented portion of the cap is gradually raised so that, when it reaches the lower end of the trough, it is in normal position and is discharged into the chute throat 74, into which it slides by gravity out of the recess of the star wheel. The throat 74 leads to a chute 75 of such dimensions as to guide the caps in single file.

For the purpose of preventing the caps being thrown out of the trough while being turned over, as above described, in rapid operation of the device, I provide cover guides 76 and 77 at the proper locations.

The discharge chute 75 conducts the caps to the desired point of disposal, which may be a stacking machine or cap applying or sealing apparatus by which they are applied to the packing receptacles for which they are intended.

In order to avoid the possibility of a cap being jammed between an approaching arm 66a and some other portion of the device in the locality where the caps are fed to the star wheel, I provide an escapement mechanism for timing the feed of caps to the star wheel in reference to movement of the latter. This escapement mechanism includes a cam 78 mounted on shaft 62 for rotation with the star wheel, and a lever 79 having at its inner end a roller 80 which is held against the periphery of cam 78 by pressure of a spring 81. The lever 79 is pivoted on the frame 65 at 82 and overlies a pawl 84 which is pivoted to the frame 65 at 83. The pawl 84 is connected to lever 79 at 85 by a connection which is slightly resilient or yieldable laterally under abnormal pressure. The pawl carries a lower detent 86 located between the pivot point 82 and cam 78, and an upper detent 87 located beyond the pivot 82. The pawl 84 lies above the path of caps in chute 50, but the detents 86 and 87 extend downwardly so that they may be moved into the path of the caps adjacent one side of the latter.

The spacing of the detents 86 and 87, and their location with respect to the lever and the chute 50, are such that the detents may be moved laterally into the adjacent side margin of the chute whereby to control the discharge of caps from the chute. The lower detent 86 is so located that when in its inwardly swung position it will engage and hold the lowermost cap in the chute, and detent 87 is so located that it will be moved into the path of the following cap when the lower detent is moved outwardly to free the lowermost cap. The movements of the detents are effected by the swinging of lever 79 by cam 78, and the cam 78 is oriented with the star wheel in such fashion that the lower detent 86 will be moved to free the lowermost cap only at a time when the approaching arm 66a is in position to permit such lowermost cap to enter freely and fully into the star wheel recess in front of it. At the time of release of the lowermost cap, the upper detent 87 is interposed in the path of the following cap and consequently arrests its movement until the lowermost cap has been discharged from the chute, whereupon the return movement of the lever 79 shifts the detent 87 to release its cap while the lower detent 86 is interposed in position to stop it when it moves to the lowermost position in the chute.

It will be observed that when a cap is in the position indicated at C⁴, it will prevent movement of another one from the approaching star wheel recess to a position where it might be jammed between the impelling arm of the star wheel and an adjacent portion of the device, as the following cap in the star wheel will simply ride along its upwardly presented margin and be held against movement out of the star wheel recess. Any caps which are thus carried beyond the throat 74 by the star wheel are held against moving out of the latter by an upstanding guide strip 88. The device shown in Fig. 2 is to insure discharge of caps from the star wheel. A flat spring 90 mounted on plate 65 supports a rubber snubber 91 in position where caps approaching throat 74 will be moved under the snubber, so that it frictionally engages their tops, thereby effecting their withdrawal from the recesses as the wheel rotates. The normal elevation of the snubber is adjustable by screw 92.

As the purposes and operations of various parts of the apparatus have been explained in the course of the foregoing description, a general explanation of the operation will suffice at this point.

Sliding downwardly in chute 50, the successive caps are stopped momentarily at position C³ by escapement detent 86, and are released successively at proper intervals to permit them to drop into the successively presented recesses 66b of the star wheel 66 which is being continuously rotated by shaft 62. Caps seated in recesses 66b are carried along in file in an orbital path by rotation of star wheel 66 or by gravity under control of said wheel. Those which are in right-side-up position, i. e., with their broader ends downward, are supported at their inwardly presented sides on the surfaces 63 and at their outwardly presented rims on ledge 68 during their progressive movement, until they reach throat 74, where they drop out of the star wheel recesses. Caps which are in upside-down position in recesses 66b find support for their inwardly presented portions on surfaces 63, but inasmuch as the relieved portions 66c accommodate their broader end portions, they occupy positions closer to shaft 62 such that their outwardly presented rims clear the ledge 68. Consequently, outwardly presented portions of such upside-down caps drop into the trough 67, such movement being aided by spring 69. Such caps, therefore, assume a steeply inclined position in which they find support at their outwardly presented rims on the bottom of trough 67 and at their inwardly presented portions on the rim of the surface 63. These caps are carried along in outwardly sloping position by or under control of the arms of the star wheel, and, as they progress, are moved to vertical position by coaction with guide 71, and then are toppled to inwardly sloping position by the guiding action of the outer wall 67a of the gradually narrowing trough. After being thus overturned, their outwardly presented portions find support on the prolongation of the ledge 68 and their inwardly presented portions on bottom of the trough 67, which gradually becomes shallower and thereby elevates the inwardly presented sides of the caps to the plane of the surface 63 as the caps are being advanced by the star wheel arms. This turning-over of the caps is completed by the time they reach the throat 74, where they slide out of the star wheel recesses in right-side-up position. Thus, all of the caps reach chute 75 in the same sequential order that they entered the star wheel from chute 50, but all are in right-side-up position.

A modified embodiment is illustrated in Figs. 8 to 13 inclusive. Fig. 8 representing a face view of a segment of the frame member, which is here designated 65'. This is formed with the turning trough 67, a portion of which is shown in Fig. 8, the locations of portions of overlying parts such as the star wheel arms 66a and a pressing device 105, hereinafter described, being shown in dot and dash lines, and parts which underlie the surface plate of the frame being shown in dash lines. In Figs. 8 to 13 inclusive the parts are shown in their normal or sloping positions. This modified construction is designed particularly to accomplish the proper handling of such caps as may have been somewhat reduced in width as by being slightly bent, as illustrated at C' in Fig. 13.

In this modified construction a portion of the frame at the outer side of the turning trough 67 is made movable by being hingedly mounted at 100 so that it may rock toward and from the shaft 62. This movable portion of the frame is designated by the reference character 65ˣ. It is pressed toward the shaft 62 by a spring 101. A hardened insert 68' is mounted at its inner margin to provide the ledge on which the outer rims of the caps may travel, and a rigid camming strip 102 is fixedly mounted along the outer limit of the cap supporting ledge 68' at a location where its radial distance from the innermost bottoms of the star wheel recesses 66b is somewhat less than the diameter of the intended caps. The width of the ledge 68' inwardly from the camming strip 102 is such as to support the outer margin of a cap which is in right-side-up position and which extends from the camming strip to the abutment or bottom of the star wheel recess, here formed by a plate 103, but inadequate to support positively the outwardly presented margin of a cap in inverted position. The relationship of the parts with a cap in right-side-up position is illustrated in Fig. 10, wherein it will be seen that the broader bottom margin of the cap bears against the camming strip 102, to which position it has been brought by the star wheel, the rocking frame portion having been swung outwardly on its hinge 100 by the camming action of the cap upon the camming strip. The relationship of a cap in upside-down position is illustrated in Fig. 11, wherein it will be seen that the rocking frame portion has likewise been swung outwardly by the camming action of the cap upon the strip 102, but due to the lesser width of the downwardly presented top portion of the cap it is not afforded positive support on the ledge member 68', said ledge member being somewhat rounded or beveled off at its inwardly presented corner. To make sure that an upside-down cap will not be retained and carried along in inverted position, I provide the pressing device which is shown in elevation in Fig. 9 and the location of which is shown in dot and dash lines designated 105 and 107 in Fig. 8. This pressing device includes a swinging arm 105 which is hinged on a stationary post 104 and pressed downwardly by a spring 106. At its inner end it carries a roller 107 which overlies a portion of the trough 67 adjacent the ledge 68' and extends somewhat below the upper level of that ledge when in its normal position. The lower portion of the roller thus lies slightly in the path of caps which are being moved along by the star wheel. If the cap is in right-side-up position so that its outer margin is securely supported on ledge 68', as illustrated in Fig. 10, it will be moved under the roller, camming the roller upwardly in order to do so, whereas, if the cap is in inverted position, it will not be supported with sufficient security at its outer margin to cam the roller upwardly, but will itself be displaced downwardly from the ledge by pressure of the roller, as illustrated in Fig. 12. Thence the cap which has been thus toppled into the inverting trough will be carried along by the star wheel arm and inverted in the course of its further progressive movement as above described in reference to the illustrations in Figs. 3 to 6 inclusive.

An advantage of this construction over that first described lies in the fact that it is not so dependent upon close accuracy in the sizing of the caps. Some slightly inaccurate caps may still be applied and sealed on packing vessels satisfactorily, and this last described apparatus will properly position such caps if they are not too far off size. An instance is illustrated in Fig. 13 wherein the cap C' is shown as somewhat arched so that its diameter in one direction is somewhat reduced. Here the rocking frame portion 65ˣ is shown at its innermost limit position, and yet the right-side-up cap may have the effective support on the ledge 68'. If the cap were distorted to a further extent, however, it would not have adequate support at its outer margin to resist the toppling action of the pressing roller 107.

It will be noted in Figs. 8 and 9 that the end portion of the ledge member 68'' from which the caps leave has been given an inwardly and downwardly deflected form. This is primarily for the purpose of compensating for any slight rearward tilting action which the roller 107 might apply to a right-side-up cap after the point of bearing of the cap on the ledge 68' has proceeded beyond the point of bearing of the roller on the cap. It is to be understood that tilting of the right-side-up caps under the pressure of the roller is prevented in this construction by an appropriate guard plate corresponding to guard plate 70 of Figs. 1 and 3.

What I claim is:

1. Apparatus for feeding and arranging closure caps or similar articles of circular peripheral form having smaller top diameter than bottom diameter, comprising ledges spaced apart from each other by a trough and having surfaces lying in a common plane and adapted conjointly to support a cap of predetermined diameter, means for disposing caps for movement in series upon said surfaces, an abutment above but closely adjacent one of said surfaces in position to be engaged by peripheral portions of caps supported on the latter, said trough having portions arranged to support a cap of the predetermined diameter in sloping position against one of said ledges and effective to swing the lower margin of such sloping cap toward said abutment incident to progressive movement of such cap along the ledge.

2. Apparatus for feeding and arranging closure caps or similar circular articles of predetermined size and of lesser diameter at the top than at the bottom, comprising ledges spaced apart from each other by an intervening trough and having surfaces lying in a common plane and adapted conjointly to support a cap of the predetermined diameter, means for disposing caps for movement progressively along said surfaces and trough in a series, an abutment associated with one of said ledges in position to engage a peripheral portion of a cap supported on the ledges, said abutment being spaced from the opposite ledge by a distance less than the maximum diameter of the cap but more than its minimum diameter, means in the trough for supporting a cap of the predetermined size in sloping position against one of the ledges, and means for swinging the lower margin of such sloping cap past its upper margin incident to its progressive movement in the trough.

3. Apparatus as specified in claim 2 and including means movable with the caps for keeping them spaced from one another in the series.

4. Apparatus as specified in claim 2 and including means for propelling caps individually and progressively along the ledges and trough.

5. Apparatus as specified in claim 2 and wherein a portion of the ledge which is farthest from said abutment is mounted for limited movement toward and from the latter, means for yieldably urging said movable ledge portion toward the abutment, and a camming strip affixed to and extending above said movable ledge portion at the side thereof remote from said abutment, the scope of movement of said ledge and camming strip permitting movement of the latter to a position where its distance from the abutment is less than the maximum diameter of the cap.

6. Apparatus as specified in claim 2 and wherein a portion of the ledge which is farthest from said abutment is mounted for limited movement toward and from the latter, means for yieldably urging said movable ledge portion toward the abutment, and a camming strip affixed to and extending above said movable ledge portion at the side thereof remote from said abutment, the scope of movement of said ledge and camming strip permitting movement of the latter to a position where its distance from the abutment is less than the maximum diameter of the cap, and the width of said movable ledge portion between the abutment and the camming strip being less than the difference between the maximum and minimum external diameters of the cap.

7. Apparatus as specified in claim 2 and wherein a portion of the ledge which is farthest from said abutment is mounted for limited movement toward and from the latter, means for yieldably urging said movable ledge portion toward the abutment, a camming strip affixed to and extending above said movable ledge portion at the side thereof remote from said abutment, the scope of movement of said ledge and camming strip permitting movement of the latter to a position where its distance from the abutment is less than the maximum diameter of the cap, and means located between the abutment and movable ledge portion for exerting downward pressure on caps overlying said ledge portion.

8. Apparatus for feeding and arranging closure caps or similar circular articles of predetermined size and of different diameter at top and bottom, comprising a wheel having circumferentially distributed recesses for accommodating the caps individually, ledges underlying portions of said wheel and adapted to support caps in said recesses, an intervening trough spacing said ledges from each other less than the predetermined maximum diameter of the caps, means for rotating said wheel to travel the recesses and caps therein progressively along said ledges and trough, said recesses being formed with abutments for limiting entry of lower peripheral portions of caps therein but arranged to clear upper peripheral portions of such caps, said abutments being spaced from the farther one of said ledges by a distance less than the maximum diameter of the caps but more than their minimum diameter, said trough including means effective to support a cap in sloping position against the ledge nearest said abutments and to reverse the slope of such cap incident to its progressive movement.

9. Apparatus as specified in claim 8 and including means timed with the wheel to feed caps into said recesses.

10. Apparatus as specified in claim 8 and including means for regulating discharge of caps from the recesses.

11. Apparatus as specified in claim 8 and wherein the ledges and wheel are inclined so that the caps travel progressively in an inclined path.

12. Apparatus as specified in claim 8 and wherein the depth of the trough decreases gradually in the direction of the progressive movement of the caps.

13. Apparatus for feeding and arranging closure caps or similar articles, comprising an operable device having a plurality of article-spacing members arranged in a series to translate articles in a continuous linear path approximating in width the width of the articles, means for actuating said device to move the spacing members continuously and progressively one following another, means for disposing a plurality of articles in a series with respective articles between juxtaposed spacing members for progressive movement through said path, means cooperating with the spacing members to prevent lateral displacement of the articles from said path, and means effective on upside-down articles in the series in the course of their continuous movement to invert them about an axis paralleling said path while they are traversing and confined in said path with the others in the series.

14. Apparatus for feeding and arranging closure caps or similar articles, comprising an operable device having a plurality of spacing members arranged to afford a series of spaced recesses each of size to accommodate one article at a time, a continuous linear operating path of a lateral width approximating the width of the articles, means for actuating said device to move the spacing members continuously and progressively in a series through said path, means for disposing respective articles in respective recesses of said members for movement progressively in a series, means cooperating with said device to maintain articles in said recesses laterally in said path, and means effective on upside-down articles in said recesses to invert them about an axis paralleling said path while moving continuously and confined laterally in said path.

15. Apparatus for feeding and arranging closure caps or similar articles, comprising a rotary device having a plurality of recesses spaced from one another circumferentially in a series, means for disposing articles in said respective recesses, means for rotating said device to move said caps progressively, means cooperating with said device to maintain the articles in series, and means effective only on upside-down articles to invert the same while in said recesses around an axis generally tangent to the rotary movement thereof and in the course of said movement.

16. Apparatus for orienting closure caps or similar articles, comprising spacing members arranged in a series, means for placing between said members a series of articles to be oriented, means for moving the spacing members progressively, means cooperating with the spacing members to maintain the interposed articles during movement in a path of lateral width approximating the width of the articles, and means effective in the course of progressive movement of the spacing members to invert only upside-down articles around axes generally paralleling the direction of movement.

17. Apparatus for orienting closure caps or similar articles as specified in claim 16 and wherein said spacing members are movable progressively in an orbit.

18. Apparatus for orienting closure caps or similar articles as specified in claim 16 and comprising discharge means for guiding the articles in series away from the spacing members, said discharge means being effective upon the articles at a location beyond the inverting means in the travel of the spacing members.

19. Apparatus for orienting closure caps or similar articles as specified in claim 16 and including supporting inclined surfaces upon which the articles are guided and whereon they travel by gravity in their progressive movement.

20. Apparatus for feeding properly and improperly oriented closure or similar articles, each having portions of different transverse width, and for inverting articles improperly oriented with reference to said portions, comprising a support, means to feed said articles in succession along said support, means positioned at a point longitudinally of the support and transversely of the path of article feed for engagement with the wider portion of a properly oriented article to sustain the same vertically during feeding without inversion in a plane parallel to its plane of movement on the support, said feeding means being operative to advance the articles past said last named means, said sustaining means being spaced from and unengageable by the wider portion of an improperly oriented article, whereby said last named wider portion is vertically unsustained at said point, means for inverting said unsustained articles around an axis paralleling the path of feeding during movement of the articles past said sustaining means, and means for discharging the articles in uniformly and properly oriented arrangement.

21. Apparatus for feeding properly and improperly oriented closure or similar articles, each having different transverse widths at opposite sides thereof, and for inverting articles oriented improperly with reference to said sides during feeding, comprising a support, means to feed said articles in succession in a curvilinear path along said support, means positioned longitudinally of the support and laterally of the path of feed for supporting engagement with the wider side of a properly oriented article to sustain the same vertically without inversion during feeding in a plane parallel to its plane of movement on the support, said feeding means being operative to advance the articles past said last named means, said sustaining means being spaced laterally from and unengageable by the wider side of an improperly oriented article, whereby said last named wider side is vertically unsustained at said point, means for inverting said unsustained articles around an axis tangent to the path of feeding during movement of the articles past said sustaining means, and means for discharging the articles in uniformly and properly oriented arrangement.

22. Apparatus for feeding properly and improperly oriented closure members of flat peripherally circular form having peripherally circular portions of different diameters, comprising means for inducing continuous progressive movement of a plurality of the members flatwise in series along a predetermined path approximating in lateral width the width of one of the members, in which series the members are disposed at random without regard to whether some or all of them are upside down, means for preventing any substantial lateral movement of any of the members relative to said path during their said continuous progressive movement, and means cooperating with said peripheral portions of the members for causing the inversion of only those members in the series which are upside down, without regard to their order of occurrence in the series.

23. Apparatus for feeding properly and improperly oriented closure members of flat peripherally circular form having peripherally circular portions of different diameters, comprising means for inducing continuous progressive movement of a plurality of the members flatwise in series along a predetermined path approximating in lateral width the width of one of the members, in which series the members are disposed at random without regard to whether some or all of them are upside down, means for preventing any substantial lateral movement of any of the members relative to said path during their said continuous progressive movement, and means engageable with the members during their said movement for passing without inversion those members which are right side up and for inverting those members which are upside down, without regard to the order in which the upside down members occur in the series, said last mentioned means engaging and coacting with said peripheral portions of said members to invert the upside down members.

ERNEST A. KRUEGER.

REFERENCES CITED

The following references are of record in the file of this patent:

UNITED STATES PATENTS

| Number | Name | Date |
|---|---|---|
| 699,565 | Pugh | May 6, 1902 |
| 1,050,565 | Ryder | Jan. 14, 1913 |
| 1,436,549 | Tibbits | Nov. 21, 1922 |
| 1,572,219 | Mudd | Feb. 9, 1926 |
| 1,777,361 | Gottschalk | Oct. 7, 1930 |
| 1,830,359 | Hamel | Nov. 3, 1931 |